(12) United States Patent
Raith

(10) Patent No.: US 6,493,550 B1
(45) Date of Patent: Dec. 10, 2002

(54) SYSTEM PROXIMITY DETECTION BY MOBILE STATIONS

(75) Inventor: Alex Krister Raith, Durham, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/196,171

(22) Filed: Nov. 20, 1998

(51) Int. Cl.[7] .................................................. H04Q 7/20
(52) U.S. Cl. ........................ 455/422; 455/411; 455/456; 455/41
(58) Field of Search ............................... 455/456, 461, 455/462, 426, 41, 432, 417, 422, 435, 515, 411; 340/539, 552, 571, 572.1, 825

(56) References Cited

U.S. PATENT DOCUMENTS

| 5,353,332 | A |   | 10/1994 | Raith et al. |
|---|---|---|---|---|
| 5,442,680 | A | * | 8/1995 | Schellinger et al. ......... 455/426 |
| 5,477,215 | A | * | 12/1995 | Mandelbaum ......... 340/825.34 |
| 5,537,474 | A | * | 7/1996 | Brown et al. ................ 380/23 |
| 5,570,467 | A |   | 10/1996 | Sawyer |
| 5,613,204 | A | * | 3/1997 | Haberman et al. .......... 455/432 |
| 5,670,950 | A | * | 9/1997 | Otsuka ................. 340/825.33 |
| 5,794,141 | A | * | 8/1998 | Zicker ........................ 455/418 |
| 5,805,067 | A | * | 9/1998 | Bradley et al. ............. 340/635 |
| 5,870,674 | A | * | 2/1999 | English ...................... 455/432 |
| 5,875,395 | A | * | 2/1999 | Holmes ...................... 455/420 |
| 5,911,120 | A | * | 6/1999 | Jarett et al. .................... 483/1 |
| 5,926,760 | A | * | 7/1999 | Khan et al. ................. 455/435 |
| 5,956,626 | A | * | 9/1999 | Kaschke et al. ............ 455/115 |
| 5,960,085 | A | * | 9/1999 | De La Huerga ............ 713/182 |
| 5,995,839 | A | * | 11/1999 | Coursey et al. ............. 455/445 |
| 6,011,973 | A | * | 1/2000 | Valentine et al. ........... 455/456 |
| 6,044,268 | A | * | 3/2000 | Haartsen ..................... 455/426 |
| 6,141,560 | A | * | 10/2000 | Gillig et al. ................. 455/550 |
| 6,167,285 | A | * | 12/2000 | Howe ......................... 455/552 |

FOREIGN PATENT DOCUMENTS

| EP | 0 700 227 A |   | 3/1996 |   |
|---|---|---|---|---|
| EP | 0880296 A | * | 11/1998 | ............ H04Q/7/38 |
| JP | 09133766 A | * | 5/1997 |   |

OTHER PUBLICATIONS

Grube, G., et al., "In–Building Wireless Coverage using a Second Mode", *Motorola Technical Developments*, vol. 27, May 1, 1996.

Ericsson Review, No. 3, 1998, "Bluetooth—The universal radio interface for ad hoc, wireless connectivity", pp. 107–117.

* cited by examiner

*Primary Examiner*—Dwayne Bost
*Assistant Examiner*—Sonny Trinh
(74) *Attorney, Agent, or Firm*—Coats & Bennett, P.L.L.C.

(57) ABSTRACT

Proximity systems in conjunction with radiocommunication systems are described. Mobile stations include proximity detectors which recognize proximity signals transmitted by a proximity system. This recognition triggers a search, for example, for a private radiocommunication control channel. In this way, mobile stations have a mechanism which is independent of public radiocommunication cell characteristics for recognizing the presence of a private radiocommunication system.

36 Claims, 5 Drawing Sheets

SYSTEM PROXIMITY DETECTION BY MOBILE STATIONS

BACKGROUND

The present invention generally relates to the field of communications systems and, more particularly, to systems wherein mobile stations interact with both public and private radiocommunication systems.

The cellular telephone industry has made phenomenal strides in commercial operations in the United States as well as in the rest of the world. Growth in major metropolitan areas has far exceeded expectations. If this trend continues, it is possible that wireless communication techniques will provide the bulk of telecommunication service in some areas. As a result of this growth and demand, wireless services have become more affordable. In light of recent trend of competitive air time rates, customers may choose to make the cellular phone their only means of personal communication. The popularity of these phones is further enhanced by their ability to be used for other (than voice) forms of transmission and reception, such as facsimile devices and modems.

In its evolution, cellular technology is increasingly expanding into new applications such as wireless PBX and private home base stations such as, for example, cordless systems. It is envisioned that a phone used in public cellular systems will also be used in the workplace and at home, both of which operate on a private system. Unlike public systems which charge for air-time, these private systems typically operate on the basis of a flat or fixed periodic charge. In order to enable cellular phones to connect to private systems without incurring air-time charges, however, owners of portions of the radio spectrum used to support public cellular systems must permit usage of their systems for access to private system. The incentive for these owners is that if users make cellular units their primary form of communication, an increase in usage of cellular phones in the public system will result. This in turn leads to increased revenue to owners of the radio spectrum in which public cellular systems operate.

Figure 1:
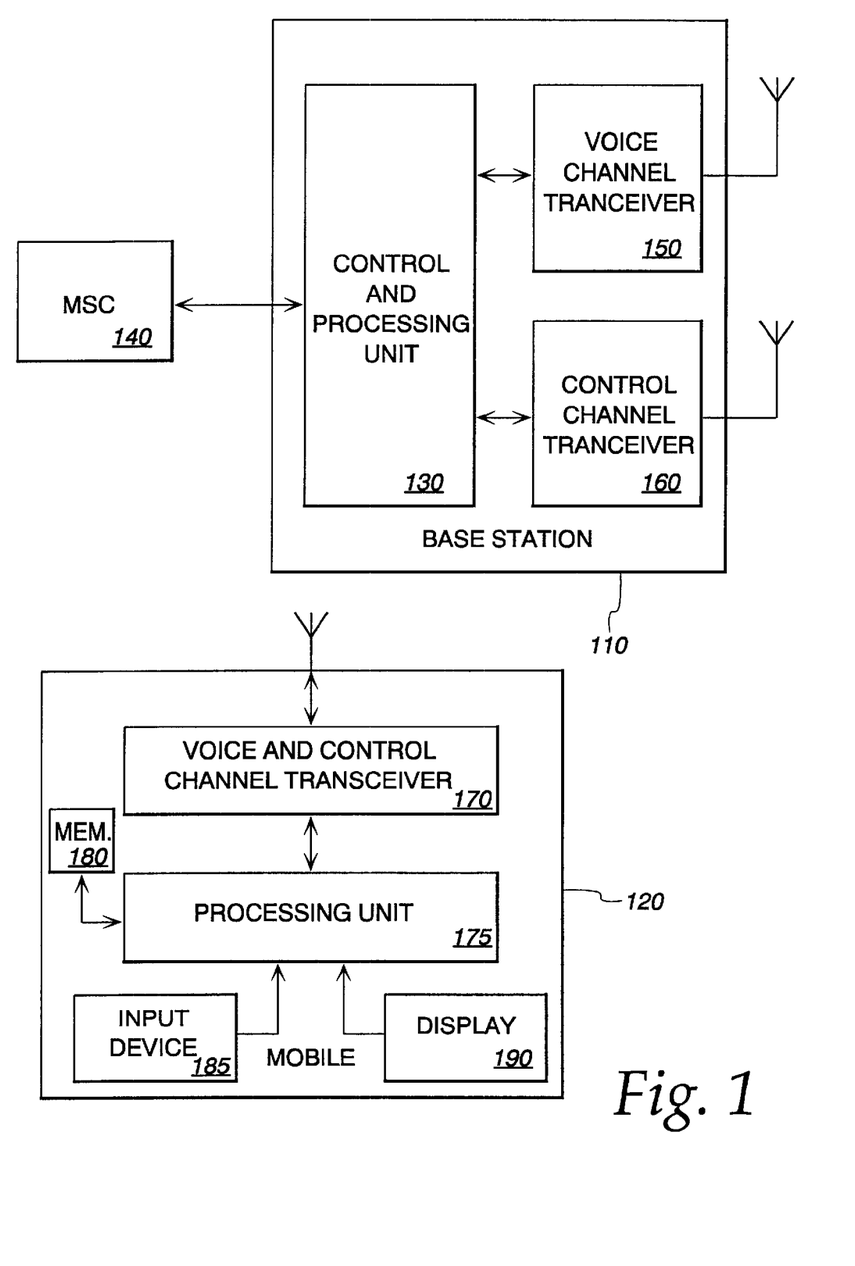
FIG. 1 is a block diagram of an exemplary cellular mobile radiotelephone system.

FIG. 1 represents a block diagram of an exemplary cellular mobile radiotelephone system, including an exemplary base station 110 and mobile station 120, which is used to describe conventional techniques for locating and locking to private radiocommunication systems, as well as novel techniques according to the present invention described below. The base station includes a control and processing unit 130 which is connected to the mobile service switching center, MSC 140, which in turn is connected to, for example, a PSTN (not shown).

The base station 110 handles a plurality of voice channels through a voice channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the voice and control transceiver 170 in mobile station 120.

Mobile station 120 receives the information broadcast on a control channel at its voice and control channel transceiver 170. Then, the processing unit 175 evaluates the received control channel information, which can include characteristics of cells that are candidates for the mobile station to lock on to, and determines on which cell the mobile should lock. Once the mobile station has received this information, it can compare its own stored information, e.g., regarding cell preferences, with those transmitted on the control channel, e.g., type of cell and network owner.

The mobile station 120 also includes an input device 185, such as a numeric keypad, which allows a user to interact with the mobile station. A display device 190, such as an LCD screen, provides a visual display of information to the user. In addition to being configured as a cellular telephone, the mobile station may also be a PC card, e.g., a card designed in accordance with the PCMCIA standard, which is connected to a personal computer, e.g., a laptop. In this latter case the display device would be the PC monitor. The mobile station also includes memory 180, which may include various information associated with private radiocommunication systems which the mobile station 120 is authorized to use.

When a mobile station powers on, it will attempt to locate a control channel from which it can, for example, obtain overhead information regarding system operation, receive paging messages and initiate calls. Various techniques are available for locating control channels in public systems, which techniques are typically specified by the applicable radiocommunication standards. An example of techniques by which control channels can be located is found in U.S. Pat. No. 5,570,467, the disclosure of which is incorporated here by reference.

In order for a cellular mobile unit to operate in a private system, it has to locate a control channel of the private system. When a user is located in the vicinity of a private system, it is desirable that the user's cellular mobile unit will lock onto the private system instead of the public system to reduce or eliminate the air-time charges mentioned above.

In addition to techniques for locating control channels associated with public systems, there are also exiting methods available for enabling mobile units to detect the presence of a nearby private system, e.g., the method specified in the TIA/EIA 136 standard. However, this method depends on the mobile unit detecting certain characteristics of a public system in which a particular private system is located. The mobile unit may, for example, have stored in its memory, certain identifying characteristics of particular public cells such as system and cell identity. Whenever the mobile unit is locked onto the public cell that matches the stored characteristics, the mobile unit may enter a control channel search algorithm for an associated private system.

According to another method, the mobile unit simply searches periodically for a private system. That is, the mobile unit periodically attempts to locate a control channel having a particular private system identity without reference to any particular public cell.

These existing methods, however, have certain disadvantages. Under the first method described above, if the operator of a public system changes the cell layout by introducing more cells, the mobile unit will not detect the stored characteristics of the public cell in which a private system is located. Thus the memory contents of the mobile unit must be updated, for example, by a user, in order to account for changes in the public system made by the operator so that the private system can still be reached. With the periodic search method, the mobile unit, by having to search constantly, drains its battery. Moreover, the mobile unit is unable to detect incoming pages on the public system while it searches for control channels of the private system. What is needed, therefore, is a more effective method for a mobile unit to detect the presence of a private system and locate control channels associated therewith.

SUMMARY

According to exemplary embodiments of the present invention, a mobile station can include a proximity detector which informs the mobile station when it is near a proximity system. The proximity system can be integrated into the private radiocommunication system or can be a standalone system that is connected to the private radiocommunication system. The proximity system can emit a signal with or without data modulated thereon for detection by the mobile station. According to other exemplary embodiments of the present invention, the proximity system can employ techniques which permit more sophisticated, two-way data transfer.

If the proximity system simply informs the mobile station of its presence, then the mobile station can institute a search for a control channel associated with the private radiocommunication system. If, on the other hand, the proximity system is able to also transfer information to the mobile station, e.g., regarding the private radiocommunication's control channel frequency (or a subset of frequencies within which the control channel can be found), this can aid the mobile station in locking onto the private radiocommunication system.

According to further exemplary embodiments of the present invention, the proximity device in the mobile station can be implemented in a number of different ways, e.g., as a radio frequency (RF) sensor, a magnetic sensor or a more sophisticated, short range receiver, and provides a trigger for the mobile station to attempt to connect to the private radiocommunication system. If the proximity detection techniques employed provide the additional capability for the proximity system to convey information other than a mere proximity signal, the mobile station can then be configured to receive and output such information. For example, the proximity system system could convey the user's e-mail or voicemail along with the proximity signal. Analogously, the mobile system can also be configured to upload information to the proximity system.

According to still other exemplary embodiments of the present invention, systems and methods provide access control to, for example, doors, buildings, etc. by authenticating the mobile station's identity and selectively providing access based on the authentication process. Authentication can be conducted between the mobile station and any one of the proximity system, the private radiocommunication system and the public radiocommunication system.

BRIEF DESCRIPTION OF THE DRAWINGS

Other features and advantages of the present invention will become apparent from the following detailed description, taken in conjunction with the accompanying drawings, which illustrate, by way of example, the principles of the invention.

DETAILED DESCRIPTION

The following description is written in terms of a cellular radiotelephone system, but it will be understood that Applicant's invention is not limited to that environment. More specifically, the following description is written using terms which may be associated with ANSI 136 compliant systems, but it will be understood by those skilled in the art that the present invention may be implemented in other communication applications including those which are designed in accordance with other standards, e.g., IS-95, GSM or PDC, as well as those which use other access methodologies, e.g., CDMA.

As mentioned above, conventional systems and techniques provide for connection by mobile stations to private radiocommunication systems using public radiocommunication systems. Consider FIG. 2, wherein a plurality of public radiocommunication system cells C1, C2 and C3 are shown as well as a single private radiocommunication system 200 whose area of radiocommunication service overlaps all three public cells. If a user typically follows a particular "normal" path to work, for example, his or her mobile station may only be programmed to search for the private radiocommunication system 200 when the mobile station recognizes public radiocommunication cells C2 and C3. For example, the mobile station might be programmed to recognize certain characteristics (i.e., their public service profiles (PSPs)) of public cells C2 and C3 such as their control channel frequencies, system identifications codes (SIDs), digital verification color code (DVCCs), system operator codes (SOCs), etc. Upon identifying cell C3, the mobile station can start to "sniff" on frequencies associated with private radiocommunication system 200. If power is found on one of these frequencies, then the mobile station can read the channel to determine if it is a control channel having a private system identification code (PSID) associated with private radiocommunication system 200. This process will continue as the mobile station moves along the path illustrated in FIG. 2 into cell C2, since this public cell also has its characteristics programmed into the mobile station for use in locating the private radiocommunication system 200.

Figure 2:
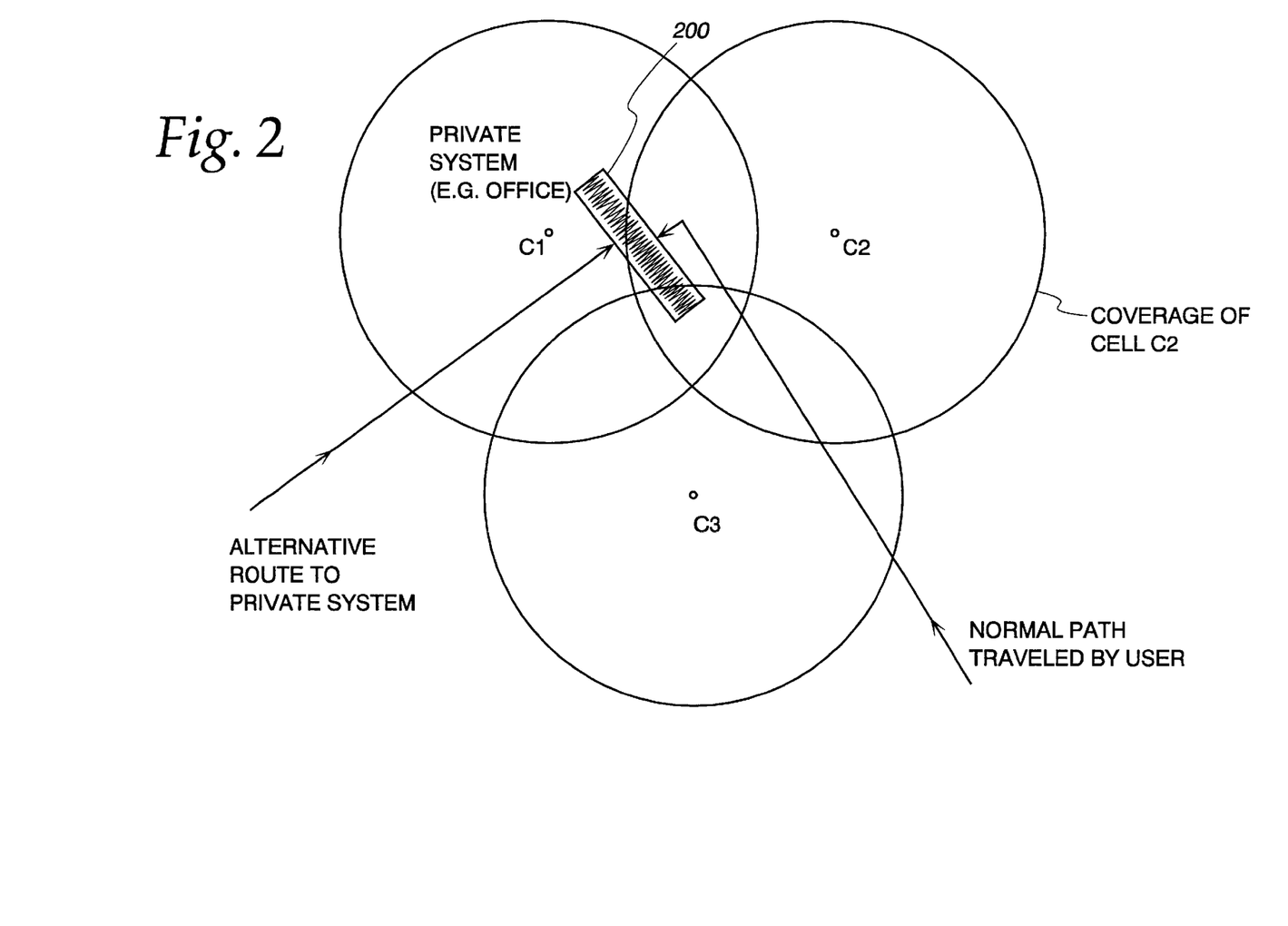
FIG. 2 is an exemplary cellular layout including portions of a public radiocommunication system and a private radiocommunication system.

If, however, the mobile station moves along the alternative route illustrated in FIG. 2, it can reach the private radiocommunication system 200's service area without entering either public cell C2 or C3. Since, in this example, the mobile station is not programmed with the PSP of cell C1, it will not be triggered to look for the private radiocommunication system 200's control channel. Exemplary embodiments of the present invention overcome this drawback of conventional systems and techniques by providing a proximity system and a proximity detector within the mobile station which provides the mobile station with a triggering mechanism for locating a private radiocommunication system's control channel, as well as many other useful features which are described below.

Figure 3:
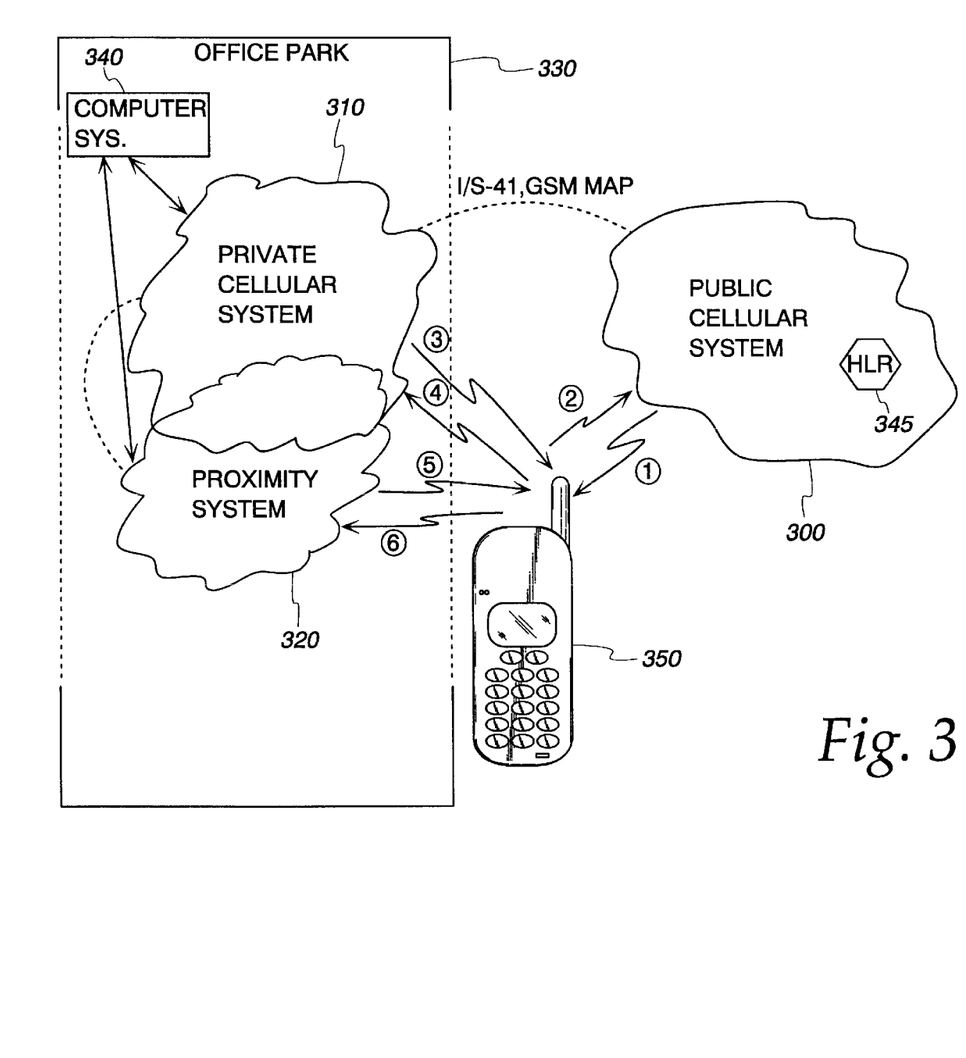
FIG. 3 is an exemplary combination illustrating interaction between a public radiocommunication system, a private radiocommunication system and a proximity system according to an exemplary embodiment of the present invention.

According to exemplary embodiments of the present invention, at least three different systems, i.e., a public radiocommunication (pubrad) system, private radiocommunication (privrad) system and a proximity system, co-exist in some fashion as illustrated in FIG. 3. Therein each of the pubrad 300, privrad 310 and proximity 320 systems are represented by service area "clouds", wherein the privrad system 310 and proximity system 320 have overlapping service areas. However, those skilled in the art will recognize that the service areas of these systems can overlap in any manner desired, e.g., the pubrad system 300's service area could encompass the privrad system 310's service area, which in turn could encompass the proximity system 320's service area, without affecting the principles described herein. Moreover, these systems can be interconnected (as illustrated by dotted lines in FIG. 3) using, for example, signalling techniques as described by TIA/EIA IS-41 or GSM MAP.

The privrad system 310 and the proximity system 320 can also be related to a certain geopolitical entity 330, e.g., an office park. Moreover, the privrad system 310 and proximity system 320 can also be connected to a computer system 340, e.g., a local area network (LAN), by which these systems can share information and cooperate in various ways described below. Pubrad system 300 may include a home location register (HLR) 345 or a similar entity which includes various information regarding subscribers and mobile equipment.

A mobile station 350 operating in conjunction with one or more of these systems, and including a proximity detector as, for example, described in any of the subsequently described embodiments, will have different types of system access/disconnection signalling with respect to these different systems. This signalling will now be described using the numbering scheme illustrated in FIG. 3, i.e., in the context of downlinks (1), (3) and (5) and uplinks (2), (4) and (6). For example, on the downlink (1) between the pubrad system 300 and the mobile station 350 there can be communicated certain conventional, explicit types of information, e.g., a neighbor list of cells on which to make signal strength measurements, the list including frequency, PSID information, etc. Those readers interested in more detail regarding neighbor lists as they can be employed in cellular radiocommunication system are directed to U.S. Pat. No. 5,353,332 to Raith et al., the disclosure of which is incorporated here by reference. From these transmissions, the mobile station 350 can also determine implicitly, the privrad system 300's PSP. On the uplink (2), mobile station 350 can transmit signals such as power down registration messages, deregistration with C-number messages (e.g., which can be used when receiving an incoming call from the pubrad system 300 to forward the call to a privrad system 310 that is unconnected via IS-41 or GSM MAP to the pubrad system 300.

As between mobile station 350 and privrad system 310, the mobile station also can receive registration-related information on downlink (3). For example, mobile station 350 can receive one or more of: information identifying the privrad system 310, i.e., its PSID, a greeting associated with privrad system 310 and a response to its registration request transmitted on uplink (4). Moreover, the privrad system 310 can also download various types of information (which information may originate from computer system 340) such as: voicemail (either the actual voicemails or a notification that voicemails exist), e-mail (again either the actual e-mails or a notification that they exist), and general information related to the geopolitical entity 330 (e.g., lunch menus, general plant information, computer network maintenance schedules, etc.).

Similar signalling can occur on the uplink (4) from the mobile station 350 to the privrad system 310. Thus, mobile station 350 can transmit a registration response on uplink (4), as well as upload information to the privrad system 310 (and, optionally, to computer system 340). This uploaded information can include, for example, a to-do-list, facsimiles to be sent, e-mails, etc.

Mobile station 350 can also communicate independently with the proximity system 320. The type of information transferred on downlink (5) and uplink (6) depends upon the type of proximity system 320 that is used. Generally speaking, and purely for illustration rather than limitation, exemplary proximity systems according to the present invention can be classified as (a) transmitting only a signal which provides mobile stations with a binary proximity indication, (b) transmitting a signal which provides mobile stations with a proximity indication and an optional, limited amount of information (e.g., PSID or group of PSIDs) or (c) two-way data transfer capability.

Various exemplary proximity systems are described below in conjunction with the mobile stations 350 that are adapted to listen for such systems. Briefly, however, for type (a) proximity systems, receipt of the proximity signal triggers the mobile station to search for the privrad system 310. This privrad system 310 may, or may not, be the privrad system to which a particular mobile station 350 is authorized to establish a connection, but proximity system 320 still aids the mobile station in recognizing when to search. For type (b) proximity systems, the proximity signal also triggers the mobile station's search for a privrad system 310, but may also provide information which is intended to aid the mobile station in its search, e.g., by providing a range of frequencies on which to search to reduce search time or by providing an identity of the privrad system 310 which is nearby such that the mobile station can determine whether a search would be useful. Note that in the latter case, the proximity system 320's signal may include a range of PSIDs rather than a unique PSID identifying a particular privrad system 310.

Moreover, such data can be transmitted explicitly, e.g., by modulating PSID digits onto a radio. frequency carrier or implicitly. As an example of implicit data transfer, consider an example wherein a proximity system can use one of eight different frequencies on which to transmit the proximity signal. The frequency can be correlated to a specific PSID or range of PSIDs. For example, the frequency number (1–8) can be the last three digits of the PSID or can identify a group of PSIDs. Then, when the mobile station detects a proximity signal of a particular frequency, it will be able to determine whether the proximity signal indicates the nearby presence of a relevant privrad 310.

For type (c) proximity systems, since complete two-way data transfer is possible, the proximity may e.g., provide the same uplink and downlink capabilities as described above with respect to the privrad system 310. An example of a type (c) proximity system can be found in relatively low cost, low range wireless transmission system defined by the recently developed "Bluetooth" technology which facilitates two-way data transmission. Bluetooth is a universal radio interface in the 2.45 GHz frequency band that enables portable electronic devices to connect and communicate wirelessly via short-range, ad hoc networks. Readers interested in various details regarding the Bluetooth technology are referred to the article entitled "BLUETOOTH—The universal radio interface for ad hoc, wireless connectivity" authored by Jaap Haartsen and found in the Ericsson Review, Telecommunications Technology Journal No. 3, 1998, the disclosure of which is incorporated here by reference. For the purposes of the present invention, only Bluetooth features of immediate interest are described here to avoid obscuring these exemplary embodiments.

In Bluetooth systems, the fixed portion may act as the master device and continuously transmit INQUIRE messages for receipt by any mobile devices that may be in the vicinity. A modem, included in a cellular mobile unit, in the vicinity would respond to this transmitted message and recognize the presence of the proximity system. The mobile station can then proceed to locate and lock on to the privrad system's control channel as described above. Alternatively, a modem included in the mobile unit may act as the master device and transmit an inquiry continuously, for example, every few seconds. The response to this inquiry by the proximity system could then be used to trigger connection to the privrad system.

Having briefly described systems according to exemplary embodiments of the present invention, the discussion now turns to exemplary mobile stations 350 which can be used in conjunction with such systems. As mentioned above, mobile stations 350 will include proximity detectors. Proximity detectors per se are used in various other applications. For example, in some office environments, personnel are restricted from accessing various parts of a facility without the possession of a valid form of identification. Employees, for example, may be equipped with a magnetically encoded badge which identifies them. The encoded information on the badge is read by a scanner which may permit access by unlocking a door or deactivating an alarm. Similarly, anti-theft systems contain a fixed or installed proximity detector for detecting the presence of a badge or key which deactivates the alarm or, conversely, for a tag which activates the alarm if not deactivated after purchasing an item.

According to exemplary embodiments of the present invention, mobile stations, e.g., cellular phones, are equipped with a device that enables the phone to detect the presence of a proximity system 320. This device may, for example, function in a substantially similar manner as an authorization badge. It does, however, differ from a badge in at least two ways. First, with the use of an authorization badge, the information encoded on the badge is retrieved by a fixed or installed device. In contrast, according to exemplary embodiments of the present invention, the device that detects a proximity system is typically located in a mobile unit and not in a fixed or installed unit (with the exception of some exemplary embodiments, wherein the mobile part may poll for nearby proximity systems, e.g., using Bluetooth technology as described above). Second, with an authorization badge, reading of a valid code by a fixed scanner leads to a door being opened or an alarm being deactivated. In exemplary embodiments of the present invention, however, the detection by the mobile unit of the proximity system 320 need not necessarily lead to access of the nearby privrad system 310, e.g., the proximity system 320 may inform the mobile station 350 of certain identifying characteristics of the privrad system 310 which negate an access attempt. In any event, a subsequent registration procedure on a control channel of the privrad system would be performed by the mobile unit to request and establish service.

In order to practice exemplary embodiments of the present invention, many forms of known proximity detectors may be utilized in mobile station 350. According to one exemplary embodiment illustrated in FIG. 4, a fixed portion (e.g., a base station, not shown in FIG. 4) associated with a type (a) proximity system 320 transmits a radio signal 401 on downlink (5) at a specific frequency. The mobile station 350 includes an RF sensitive device 402 coupled to a small antenna 404. This device 402 generates, for example, an interrupt signal responsive to receipt of this particular signal from the fixed part of the proximity system. The signal informs the mobile station 350, at a minimum, that it is near to a privrad system 310. Accordingly, when microprocessor 406 receives the interrupt signal from RF sensitive device 402, it can initiate a search for a control channel on downlink (3) (as represented by signal 408). Upon locating such a control channel, the mobile station may then determine whether the PSID of the privrad system 310 matches any one of the stored private system identities (PSID), e.g., using the techniques described in the ANSI 136 standard for PSID log-in.

Figure 4:
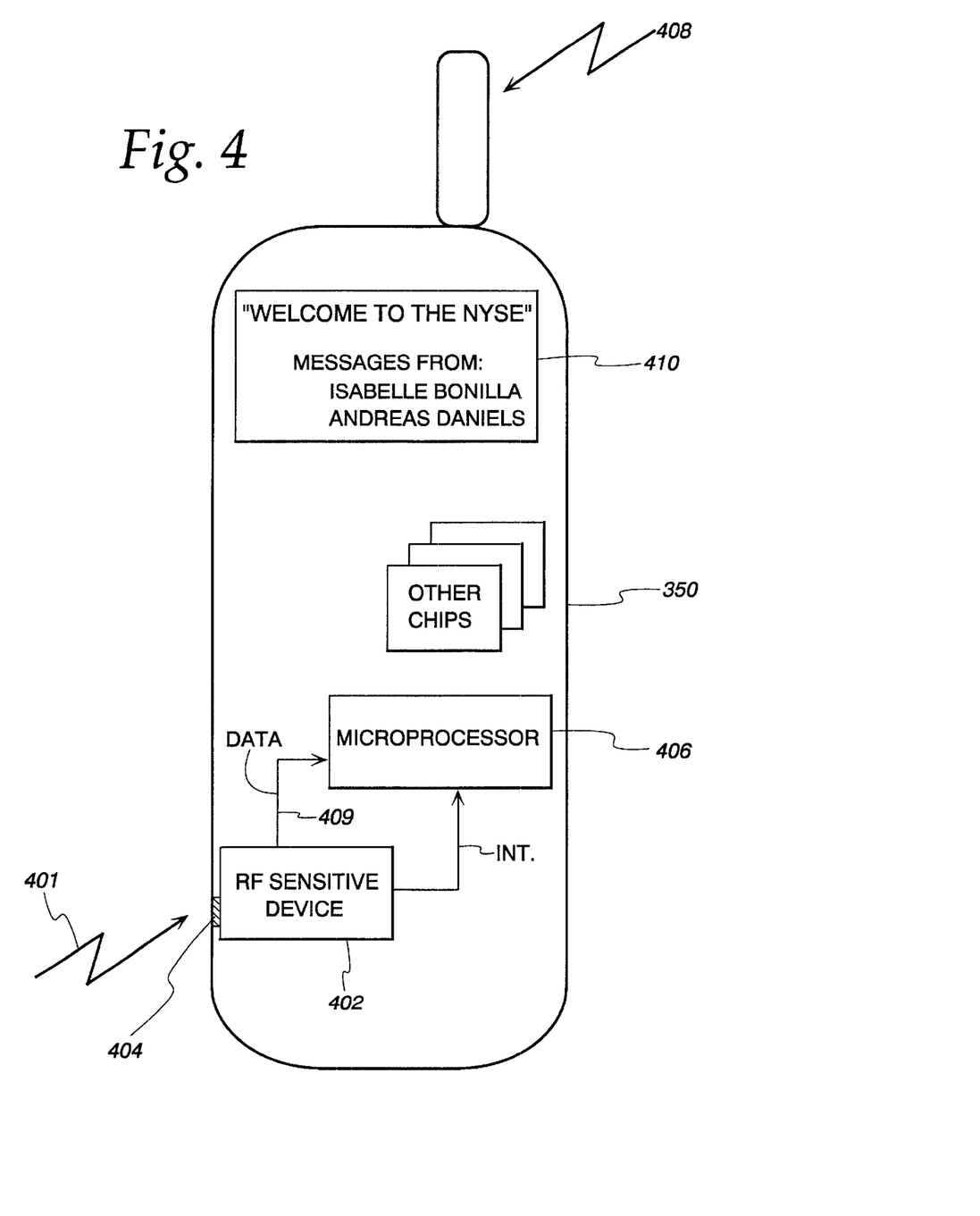
FIG. 4 is an exemplary mobile station having an RF sensitive proximity detector according to the present invention.

If proximity system 320 is a type (b) or type (c) system, i.e., it can (optionally) transmit information in the signal 401 beyond that needed to generate an interrupt signal, then the mobile station 350 can use this information in various ways. For example, if signal 410 contains a PSID (or a range of PSIDs), then this information can be delivered to the microprocessor 406 on an optional data bus 409 and used to determine whether the nearby privrad system 310 is one to which the mobile station 350 is authorized to connect with. As another alternative, the proximity system 320 could transmit a frequency (or range of frequencies) on which the nearby privrad system 310's control channel is located. The mobile station can then use this information to reduce the search time for this privrad system's control channel.

As yet another example, if the proximity system 320 is type (b) or type (c), then the fixed part of the proximity system 320 may transmit a code modulated onto the proximity signal on downlink (5) which indicates the mobile station's current position. This code may then be used by the mobile station 350 to search a sub-part of the relevant portion of the spectrum for the control channel (3) of the nearby privrad system 310. Moreover, when the mobile station 350 locates the control channel of the privrad system 310 and logs-in thereto on uplink (4), the mobile station can relay the location code (transmitted by the proximity system). Then, the fixed part of the privrad system 310 can relay the user's log-in information, along with the location code, to a central database within computer system 340. This database can be used by the privrad system or the LAN of the office park 330 to provide reports regarding the user's whereabouts, which reports can, for example, be output to an operator.

As an alternative to an RF proximity detector, a magnetic proximity detector could be employed in mobile station 350. For example, the fixed portion of the proximity system 320 can generate a static magnetic field and the mobile portion 350 can include a magnetic sensor which detects the static magnetic field. Again, detection of this magnetic field will result, for example, in an interrupt signal being forwarded to the microprocessor 406, which in turn searches for the private system as described above. Other technologies in addition to RF and magnetic can be used to implement the proximity detector as will be appreciated by those skilled in the art. Regardless of the type of proximity detector used, it can be incorporated into a removable part of the mobile station, e.g., a smart card such as the subscriber identity module (SIM) card used in GSM systems.

Figure 5:
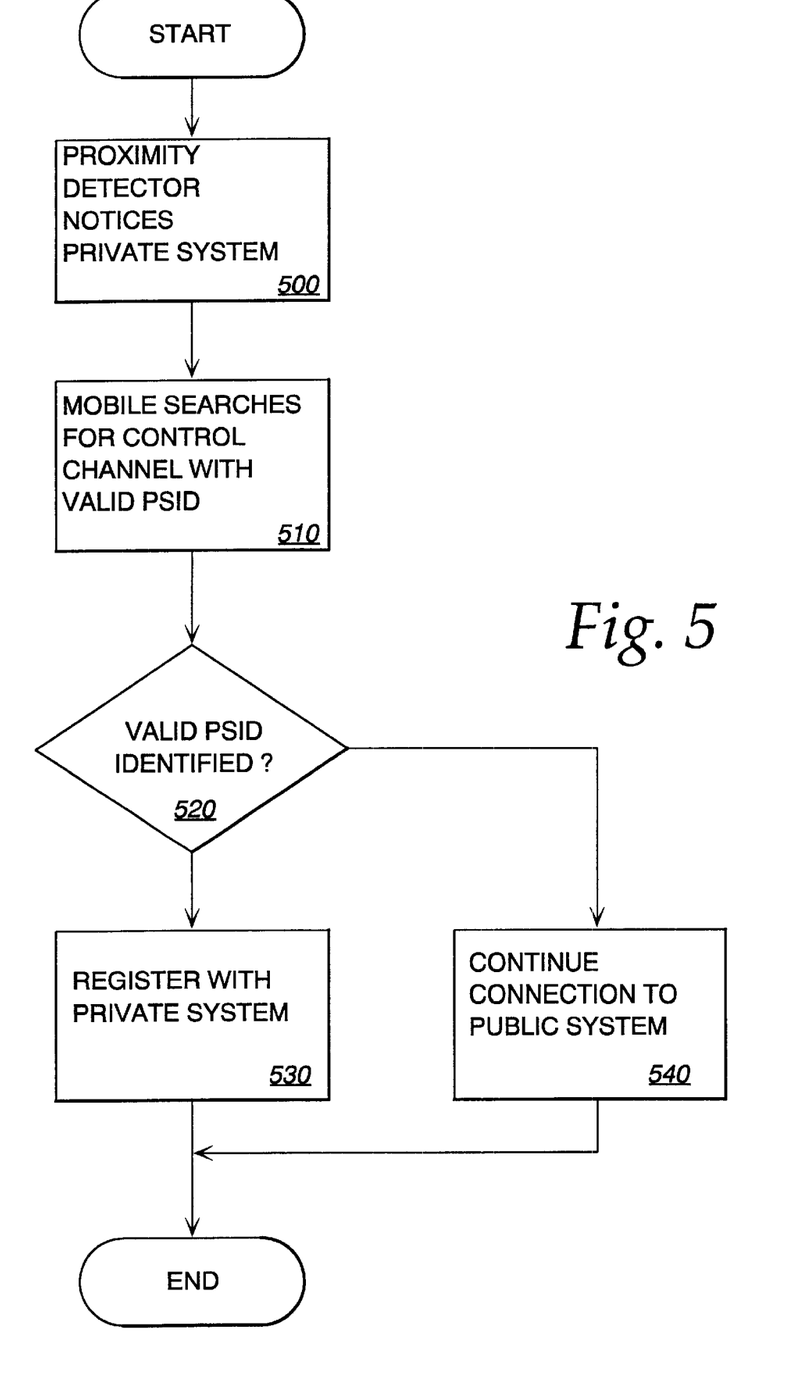
FIG. 5 is a flowchart illustrating an exemplary method according to the present invention.

Thus, a method for recognizing privrad systems and locking thereto according to exemplary embodiments of the present invention can be summarized as illustrated in the flowchart of FIG. 5. Therein, at block 500 the mobile receives an indication that it is proximate, e.g., within communication range of, a privrad system. At step 510, the mobile station then searches for a relevant control channel, e.g., by tuning to one or more pre-stored frequencies and looking for a PSID corresponding to a privrad system that the user is authorized to use. If found at step 520, the mobile station then registers with the privrad system at block 530. Otherwise, the mobile station maintains its connection to the pubrad system at block 540.

Just as Applicant believes that it will be beneficial to rapidly determine when the mobile station is near to a privrad system, it may also be useful to know when the mobile station is leaving a privrad system and entering an area in which a pubrad system provides radiocommunication coverage. This information can then be used to trigger a search for a pubrad control channel. For example, if the aforedescribed proximity detectors and proximity systems provide location related information to the mobile station, this information can be correlated with exit from a privrad system/entry into a pubrad system area. Triggering of pubrad control channel searching can also be predicated on reduced received signal strength on the current privrad control channel.

Similarly, if the proximity detection system between the mobile station and the fixed part of the system enables two-way data transfer, authentication procedures can be employed, e.g., those used in conventional cellular systems, to authorize the user's activity. The authentication process can be performed in a variety of ways depending upon, for example, the entity that is responsible for performing authentication of the mobile station 350. If, for example, all three systems 300, 310 and 320 are interconnected as illustrated in FIG. 3, then any one of the systems can perform authentication of the mobile station. If the authenticating entity is the pubrad system 300, e.g., using HLR 345, then authentication can be performed communicating on the downlink (3) and the uplink (4) of the privrad system 310 or on the downlink (5) and the uplink. (6) of the proximity system 320 with information being conveyed via the IS-41 or GSM-MAP connections. In this example, since the pubrad system 300 is the authenticating entity, the authentication process can be carried out using the same key and authentication algorithm as used in the cellular system. Alternatively, of course, a different key and/or algorithm may still be used.

If desired either the privrad system or the proximity system can also act as the authenticating entity. In such cases, authentication would be performed using respective communication link pairs (3) and (4) or (5) and (6), respectively. A separate key, i.e., distinct from that used in the pubrad system 300 for authentication, can be used when either the privrad system or the proximity system act as the authenticating entity to avoid having to communicate this information from the privrad system 300.

Coupling authentication with proximity systems as described above creates various new and interesting usages for the present invention. For example, the mobile station 350 (or the smart card within the mobile station) could function as a key to unlock a door of office park 330. When near a locked door within this facility, the mobile station's authorization to enter can be determined using one of the aforedescribed authentication procedures. More specifically, as an example, the smart card within the mobile station may include the proximity detector. When the proximity signal is received, the smart card can then send a signal to the mobile station's processor to search for the privrad system 310's control channel and log-in. After logging in to the system, the mobile station may perform authentication via the privrad system. If successful, the authentication results can be shared with the proximity system 320 and the nearby door can be unlocked.

Although the invention has been described and illustrated with reference to specific embodiments thereof, it is not intended that the invention be limited to these illustrative embodiments. Those skilled in the art will recognize that modifications and variations can be made without departing from the spirit of the invention.

What is claimed is:

1. A mobile station comprising:
   a first receiver for receiving signals over an air interface within a range of frequencies,
   a second receiver operating concurrently with said first receiver for receiving a proximity signal indicating the presence of a radiocommunication system, said proximity signal not being within said range of frequencies; and
   a processor for processing said received signals and said received proximity signal, wherein receipt of said proximity signal triggers said processor to tune said first receiver to a control channel associated with said radiocommunication system.

2. The mobile system of claim 1, wherein said received proximity signal includes one or more additional information elements and said second receiver is further configured to read said one or more additional information elements.

3. The mobile station of claim 1, wherein said second receiver includes an RF sensitive device.

4. The mobile station of claim 1, wherein said second receiver includes a short range receiver.

5. The mobile station of claim 2, wherein said additional information elements include one or more of: email information, voice mail information, and general information.

6. The mobile station of claim 2, wherein said one or more additional information elements include information associated with a control channel associated with said radiocommunication system.

7. The mobile station of claim 2, wherein said one or more additional information elements further include information associated with a range of frequencies within which a control channel associated with said radiocommunication system can be found.

8. The mobile station of claim 1, wherein said second receiver is included within a smart card.

9. The mobile station of claim 1, further comprising a display and wherein said processor operates to output a preprogrammed message on said display in response to receipt of said proximity signal.

10. A fixed portion of a radiocommunication system comprising:
    a transceiver for transmitting and receiving radio signals over an air interface within a range of frequencies; and
    a device for transmitting a proximity signal not within said range of frequencies, said proximity signal indicating a presence of said fixed portion of said radio communicating system and including data which indicates at least one of a control channel number, a frequency associated with a control channel being transmitted by said transceiver, a private system identity (PSID) code associated with said fixed portion, a range of frequencies within which a control channel is transmitted by said transceiver, and a range of PSIDs.

11. The fixed portion of claim 10, wherein said fixed portion includes a base station.

12. The fixed portion of claim 10, wherein said data includes location information.

13. A method for performing access control in a radiocommunication system comprising
    a) detecting, via a second receiver in a mobile station, a proximity signal indicating the presence of a radiocommunication system transmitting in a range of frequencies associated with said radio communication system, said proximity signal not being within said range of frequencies;

b) in response to step a), tuning a first receiver in said mobile station to at least one frequency within said range of frequencies to receive a communication signal from said radiocommunication system.

14. A mobile station comprising:

a first receiver for receiving signals over an air interface within a range of frequencies, a second receiver operating concurrently with said first receiver for receiving a proximity signal not being within said range of frequencies and having no information modulated thereon, said proximity signal indicating the presence of a radiocommunication system; and a processor for processing said received signals and said received proximity signal, wherein receipt of said proximity signal triggers said processor to initiate a search by said first receiver for a control channel signal associated with said radiocommunication system.

15. The mobile station of claim 14, wherein said second receiver includes an RF sensitive device.

16. The mobile station of claim 14, wherein said second receiver includes a magnetic sensor.

17. The mobile station of claim 14, wherein said second receiver includes a short range receiver.

18. The mobile station of claim 14, wherein said second receiver is included within a smart card.

19. The mobile station of claim 14, further comprising a display and wherein said processor operates to output a preprogrammed message on said display in response to receipt of said proximity signal.

20. A fixed portion of a radiocommunication system comprising:

a transceiver for transmitting and receiving radio signals over an air interface within a range of frequencies; and a device for transmitting a proximity signal not within said range of frequencies, said proximity signal indicating a presence of said fixed portion of said radio communicating system and including no information modulated thereon.

21. The fixed portion of claim 20, wherein said fixed portion includes a base station.

22. A method for performing access control in a radiocommunication system comprising:

a) detecting, via a second receiver in a mobile station, a proximity signal having no information modulated thereon indicating the presence of a radiocommunication system transmitting in a range of frequencies associated with said radio communication system, said proximity signal not being within said range of frequencies;

b) in response to step a), initiating a search by a first receiver in said mobile station within said range of frequencies for a control channel associated with said radiocommunication system.

23. A mobile station comprising:

a first receiver for receiving signals over an air interface within a range of frequencies, a second receiver operating concurrently with said first receiver for receiving one or more proximity signals not being within said range of frequencies, said proximity signals indicating the presence of a radiocommunication system;

a second transmitter operative to transmit information to said radiocommunication system on one or more frequencies not within said range of frequencies; and a processor for processing said received signals and said received proximity signals, wherein receipt of said proximity signals triggers said processor to transmit information to said radiocommunication system via said second transmitter, and to tune a first transmitter to a control channel within said range of frequencies, said control channel associated with said radiocommunication system.

24. The mobile station of claim 23 wherein said second receiver and said second transmitter comprise an interface to an ad hoc wireless network.

25. The mobile station of claim 23 wherein said ad hoc wireless network is a Bluetooth® network.

26. The mobile system of claim 23, wherein said received proximity signal includes one or more additional information elements and said second receiver is further configured to read said one or more additional information elements.

27. The mobile station of claim 26, wherein said additional information elements include one or more of: email information, voice mail information, and general information.

28. The mobile station of claim 26, wherein said one or more additional information elements include information associated with a control channel associated with said radiocommunication system.

29. The mobile station of claim 26, wherein said one or more additional information elements further include information associated with a range of frequencies within which a control channel associated with said radiocommunication system can be found.

30. The mobile station of claim 23, wherein said second transmitter is operative to transmit information from said mobile station to said radiocommunication system, said information including one or more of: user identifying information, email information, and general information.

31. The mobile station of claim 23, wherein said second receiver is included within a smart card.

32. The mobile station of claim 23, further comprising a display and wherein said processor operates to output a preprogrammed message on said display in response to receipt of said proximity signal.

33. A fixed portion of a radiocommunication system comprising:

a first transceiver for transmitting and receiving radio signals over an air interface within a range of frequencies; and a second transceiver for transmitting a proximity signal not within said range of frequencies, said proximity signal indicating a presence of said fixed portion of said radio communicating system, and for receiving information transmitted by a mobile station not within said range of frequencies.

34. The fixed portion of claim 33, wherein said fixed portion includes a base station.

35. The fixed portion of claim 33, wherein said fixed portion includes a Bluetooth® interface.

36. A method for performing access control in a radiocommunication system comprising:

a) detecting, via a second receiver in a mobile station, a proximity signal indicating the presence of a radiocommunication system transmitting in a range of frequencies associated with said radio communication system, said proximity signal not being within said range of frequencies;

b) in response to step a), tuning a first receiver in said mobile station to a control channel within said range of frequencies, said control channel associated with said radiocommunication system; and c) transmitting information to said radiocommunication system outside of said range of frequencies.

* * * * *